(12) United States Patent
Pignagnoli et al.

(10) Patent No.: US 9,738,767 B2
(45) Date of Patent: Aug. 22, 2017

(54) LOW PRESSURE PROCESS FOR FROTHING POLYURETHANE OR POLYISOCYANURATE

(71) Applicant: Dow Global Technologies LLC, Midland, MI (US)

(72) Inventors: Francesca Pignagnoli, Nell'emilia (IT); Eric M. Rexrode, Missouri City, TX (US); Kelly R. Flaherty, New Albany, OH (US); Giuseppe Vairo, Corregio (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/770,239

(22) PCT Filed: Feb. 25, 2014

(86) PCT No.: PCT/US2014/018332
§ 371 (c)(1),
(2) Date: Aug. 25, 2015

(87) PCT Pub. No.: WO2014/143541
PCT Pub. Date: Sep. 18, 2014

(65) Prior Publication Data
US 2016/0002427 A1 Jan. 7, 2016

Related U.S. Application Data

(60) Provisional application No. 61/791,674, filed on Mar. 15, 2013.

(51) Int. Cl.
| | | |
|---|---|---|
| *C08J 9/12* | (2006.01) | |
| *B29C 44/34* | (2006.01) | |
| *C08J 9/14* | (2006.01) | |
| *C08G 18/76* | (2006.01) | |
| *C08G 18/18* | (2006.01) | |
| *C08G 18/40* | (2006.01) | |
| *C08G 18/48* | (2006.01) | |
| *C08J 9/30* | (2006.01) | |
| *B29K 75/00* | (2006.01) | |
| *C08G 101/00* | (2006.01) | |

(52) U.S. Cl.
CPC ............ *C08J 9/127* (2013.01); *B29C 44/3403* (2013.01); *C08G 18/1808* (2013.01); *C08G 18/1816* (2013.01); *C08G 18/4018* (2013.01); *C08G 18/4816* (2013.01); *C08G 18/7664* (2013.01); *C08J 9/122* (2013.01); *C08J 9/141* (2013.01); *C08J 9/142* (2013.01); *C08J 9/143* (2013.01); *C08J 9/30* (2013.01); *B29K 2075/00* (2013.01); *C08G 2101/005* (2013.01); *C08J 2201/022* (2013.01); *C08J 2203/02* (2013.01); *C08J 2203/06* (2013.01); *C08J 2203/12* (2013.01); *C08J 2203/14* (2013.01); *C08J 2203/184* (2013.01); *C08J 2375/04* (2013.01)

(58) Field of Classification Search
CPC ....... C08J 9/30; C08J 2203/06; C08J 2203/14
See application file for complete search history.

(56) References Cited

U.S. PATENT DOCUMENTS

| | | | |
|---|---|---|---|
| 5,180,082 A | 1/1993 | Cherfane | |
| 6,303,667 B1 | 10/2001 | Kruecke | |
| 7,563,384 B2 | 7/2009 | Thomas et al. | |
| 7,655,610 B2 | 2/2010 | Singh et al. | |
| 2002/0147243 A1* | 10/2002 | Wheeler | B29C 44/3442 521/50 |
| 2006/0025493 A1* | 2/2006 | Simpson | C08G 18/4837 521/155 |
| 2006/0270746 A1 | 11/2006 | Younes et al. | |
| 2011/0218262 A1 | 9/2011 | Eling et al. | |

FOREIGN PATENT DOCUMENTS

| | | | | |
|---|---|---|---|---|
| DE | CA 2260343 A1 * | 8/1999 | ......... | C08G 18/6677 |
| WO | 03/035731 A1 | 5/2003 | | |
| WO | 03/064236 A1 | 8/2003 | | |

* cited by examiner

*Primary Examiner* — Melissa Rioja
(74) *Attorney, Agent, or Firm* — Husch Blackwell LLP

(57) ABSTRACT

A process of making a polyurethane or polyisocyanurate foam comprises the step of mixing under low pressure: (A) An isocyanate; (B) A compound reactive with the isocyanate, e.g., a polyol; (C) A liquid blowing agent; and (D) Carbon dioxide.

7 Claims, No Drawings

LOW PRESSURE PROCESS FOR FROTHING POLYURETHANE OR POLYISOCYANURATE

FIELD OF THE INVENTION

This invention relates to a process of frothing polyurethane (PUR) or polyisocyanurate (PIR) using low pressure equipment. In one aspect the invention is a low-pressure process of frothing polyurethane or polyisocyanurate using a non-hydrocarbon, low global warming potential (GWP) blowing agent while in another aspect, the invention relates to such a process in which gaseous carbon dioxide is used as a frothing agent.

BACKGROUND OF THE INVENTION

Polyurethane (PUR) and polyisocyanurate (PIR) foams are typically made from two component systems in which one component comprises an isocyanate and the other component comprises a polyol and/or other material reactive with the isocyanate. The two components are mixed under high or low pressure in the presence of a catalyst and blowing agent, with or without various additives. Representative of the mixers used in high pressure processes is the radial-flow, rotor-stator mixer, e.g., an OAKES mixer. Representative of mixers used in low pressure processes is the impingement mixer, e.g., an ELIMINATOR mixer.

"Froth foams" are blends that exit the applicator gun component of the mixer in a frothy state. This is in contrast to the "pour" foams which exit as a liquid and then cream and expand sometime after exiting the gun. Exiting the applicator gun as a froth allows for two important benefits to the end-user. One, the frothy foam will be resistant to leaking out of molds that have loose tolerances or other 'leaky' characteristics. Two, if there is enough frothing energy during material impingement in the gun, mixing from the gas expansion may be enough to give excellent polyol/isocyanate mixing without using a static mixer at the end of the applicator gun. Eliminating the static mixer is an advantage to the end-user because it frees the end-user from having to clean or flush the static mixer.

The typical froth blowing agent used in the United States is HFC-134a which is a gas at room temperature and has a zero ozone depletion. However, it has a high global warming potential (GWP). The direction of the marketplace and future legislation is towards low global warming potential blowing agents and away from high global warming potential blowing agents. A low-cost, low global warming potential gaseous blowing agent is very desirable for 'froth' foam end-users.

SUMMARY OF THE INVENTION

In one embodiment the invention is the use of gaseous carbon dioxide ($CO_2$) as a blowing agent in a low pressure foaming process. In one embodiment, the gaseous carbon dioxide is added to either the polyol blend or the isocyanate blend, or both. In one embodiment the carbon dioxide is added as a third-stream, e.g., in a low pressure impingement mixer the polyol, isocyanate, and $CO_2$ streams are fed to the mixer head as separate streams. Enough carbon dioxide is used to form a froth to eliminate leaks in 'leaky' molds and to allow for mixing without a static mixer, but not so much as to result in an unacceptable K-factor or shrinkage. Lower levels of carbon dioxide may still have an advantage to the end user by providing a means of eliminating leaking in the end-user's molds.

In one embodiment the invention is a process of making a polyurethane or polyisocyanurate foam, the process comprising the step of mixing under low pressure:
(A) An isocyanate;
(B) A compound reactive with the isocyanate, e.g., a polyol;
(C) A blowing agent liquid at 23° C.; and
(D) Carbon dioxide.

In one embodiment the blowing agent is a physical blowing agent, preferably one with a low GWP. In one embodiment the blowing agent is a hydrocarbon, particularly a pentane. In one embodiment the carbon dioxide is gaseous at the time it is mixed with one or more of the other components of the process. In one embodiment the carbon dioxide is liquid at the time it is mixed with one or more of the other components of the process. In one embodiment the mixing is performed using a low pressure impingement mixer.

DETAILED DESCRIPTION OF THE PREFERRED EMBODIMENT

Definitions

Unless stated to the contrary, implicit from the context, or customary in the art, all parts and percents are based on weight. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, molecular weight.

"Low pressure" and like terms mean a pressure of less than or equal to 2.1 MPa, typically pressure in a range from 0.7 to 2.1 MPa, more typically from 1 to 1.9 MPa and even more typically from 1.4 to 1.7 MPa.

"High pressure" and like terms mean, in the context of preparing a PUR or PIR foam, a pressure of greater than 2.1 MPa, typically a pressure in a range from 2.1 to 40 MPa, more typically in a range from 7 to 35 MPa and even more typically in a range from 14 to 28 MPa.

Global warming potential" and like terms are relative measures of how much heat a greenhouse gas traps in the atmosphere. It compares the amount of heat trapped by a certain mass of the gas in question to the amount of heat trapped by a similar mass of carbon dioxide. GWP is calculated over a specific time interval, commonly 20, 100 or 500 years. GWP is expressed as a factor of carbon dioxide (whose GWP is standardized to 1). For example, the 20-year GWP of methane is 72, which means that if the same mass of methane and carbon dioxide were introduced into the atmosphere, that methane will trap 72 times more heat than the carbon dioxide over the next 20 years. "Low GWP" means a 20-year GWP of less than 72, preferably less than 50, more preferably less than 25 and even more preferably less than 10. "High GWP" means a 20-year GWP of 72 or greater.

"K-factor" and like terms means the measure of heat that passes through one square foot of material that is 1-inch thick in an hour. Usually, insulation materials have a K Factor of less than 1. The lower the K value, the better the insulation.

Process of Forming a Polymeric Froth

In one embodiment, a first prepolymer phase with reactive hydrogen functionality e.g., a polyol, is introduced into the mixing chamber of a low pressure mixer while a second prepolymer phase with isocyanate functionality is also introduced simultaneously into the same mixing chamber of the low pressure mixer. Carbon dioxide and a liquid blowing agent can be introduced separately through separate inlets or combined with one or both of the first and second prepolymer phases. Optionally, a surfactant, catalyst and/or other components can be introduced separately or first mixed with one or both of the prepolymer phases.

The reacting two prepolymer phases combine with an inert gas to form a forth of liquid mixture with entrained, finely divided bubbles of carbon dioxide of approximately uniform size. The residence time of the materials within the mixer from inlet to outlet can vary with the nature of the materials, operating conditions of the mixer, but typically the residence time is from a fraction of a second to less than a minute.

The term isocyanate prepolymer phase refers to a liquid containing substantially no organic solvent and also has at least two isocyanate groups per one molecule. Such an isocyanate prepolymer further refers to isocyanate prepolymer in which the content of an organic solvent in the prepolymer is 10 percent by weight or less based on the total weight of the prepolymer phase. To eliminate the step of removing the organic solvent, the content of the organic solvent may, for example, be 5 percent by weight or less based on the total weight of the prepolymer phase; or in the alternative, the content of the organic solvent may be 1 percent by weight or less based on the total weight of the prepolymer phase; or in another alternative, the content of the organic solvent may be 1 percent by weight or less based on the total weight of the prepolymer phase. In a preferred embodiment, the isocyanate prepolymer phase does not contain any solvent.

The number average molecular weight of the isocyanate prepolymer used in the present invention may, for example, be within the range from monomeric materials to prepolymers with a number average molecular weight (Mn) of 1,000 to 200,000, typically 1,000 to 50,000 on a solvent-free basis.

The isocyanate prepolymer used in the present invention may be produced by any conventionally known processes, for example, solution process, hot melt process, or prepolymer mixing process. Furthermore, the isocyanate prepolymer may, for example, be produced via a process for reacting a polyisocyanate compound with an active hydrogen-containing compound and examples include, but are not limited to, (i) a process for reacting a polyisocyanate compound with a polyol compound without using an organic solvent, and (ii) a process for reacting a polyisocyanate compound with a polyol compound in an organic solvent, followed by removal of the solvent.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations of two or more of these.

The active hydrogen-containing prepolymer used in the present invention includes, but is not limited to, a compound having comparatively high molecular weight ("high-molecular weight compound") and a compound having comparatively low molecular weight ("low-molecular weight compound").

The Mn of the high-molecular weight compound may, for example, be within a range from 300 to 50,000; or in the alternative, within a range from 500 to 5,000. The number average molecular weight of the low-molecular weight compound may, for example, be less than 300. These active hydrogen-containing compounds may be used alone, or two or more kinds of them may be used in combination.

Among these active hydrogen-containing compounds, examples of the high-molecular weight compound include, but are not limited to aliphatic and aromatic polyester polyols including caprolactone based polyester polyols, seed oil based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyol, polythioether polyol, polyolefin polyols such as polybutadiene polyol, and so on. The active hydrogen containing compounds may also comprise primary and secondary amines, or prepolymers terminated with a primary or secondary amine.

As the polyester polyol, polyester polyol, for example, obtained by the polycondensation reaction of a glycol and an acid may be used.

Examples of the glycol, which can be used to obtain the polyester polyol, include, but are not limited to, ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, bishydroxyethoxybenzene, 1,4-cyclohexanediol, 1,4-cyclohexane-dimethanol, bisphenol A, mixture of 1,3- and 1,4-cyclohexanedimethanol (UNOXOL™-diol), hydrogenated bisphenol A, hydroquinone, and alkylene oxide adducts thereof. These low molecular weight species can also be used directly in the mixer as can their analogous amines.

Examples of the acid, which can be used to obtain the polyester polyol, include, but are not limited to, succinic acid, adipic acid, azelaic acid, sebacic acid, dodecanedicarboxylic acid, maleic acid, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives of these hydroxycarboxylic acids.

Also polyester obtained by the ring-opening polymerization reaction of a cyclic ester compound such as ε-caprolactone, and copolyesters thereof may be used.

Examples of the polyether polyol include, but are not limited to, compounds obtained by the poly-addition reaction of one or more kinds of compounds having at least two active hydrogen atoms such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, aconite saccharide, trimellitic acid, hemimellitic acid, phosphoric acid, ethylenediamine, diethylenetriamine, triisopropanolamine, pyrogallol, dihydroxybenzoic acid, hydroxyphthalic acid, and 1,2,3-propanetrithiol with one or more kinds among ethylene oxide, propylene oxide, butylene oxide, styrene oxide, epichlorohydrin, tetrahydrofuran, and cyclohexylene.

Examples of the polycarbonate polyol include, but are not limited to, compounds obtained by the reaction of glycols such as 1,4-butanediol, 1,6-hexanediol, and diethylene glycol, with diphenyl carbonate and phosgene.

Among the active hydrogen-containing compounds, the low-molecular weight compound is a compound which has at least two active hydrogens per one molecule and has a number average molecular weight of less than 300, and examples thereof include, but are not limited to, glycol components used as raw materials of the polyester polyol; polyhydroxy compounds such as glycerin, trimethylolethane, trimethylolpropane, sorbitol, and pentaerythritol; and amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanedi-amine, 1,4-cyclohexanediamine, 1,2 propane-diamine, hydrazine, diethylenetriamine, and triethylenetetra-amine.

The term "surfactants" refers to any compound that reduces surface tension between a liquid and a gas. Nonionic surfactants are useful in the practice of this invention and include, but are not limited to, block copolymers containing ethylene oxide and silicone surfactants, such as ethoxylated alcohol, ethoxylated fatty acid, sorbitan derivative, lanolin derivative, ethoxylated nonyl phenol or alkoxylated polysiloxane. Such surfactants may contain reactive hydrogen functionality so that they may be incorporated into the growing polymer.

Polyurethane prepolymers are typically chain extended with a chain extender which are well known to those skilled in the art.

The blowing agents used in the practice of this invention are typically liquid at room temperature (e.g., 23° C.) and include water, physical blowing agents and chemical blowing agents. The liquid physical blowing agents are inert toward the feed components and vaporize under the conditions of the urethane reaction. The boiling point of these compounds is preferably less than 50° C. Physical blowing agents also include compounds which are gaseous at room temperature and are introduced into and/or dissolved in the feed components under pressure, examples being alkanes, more particularly low-boiling alkanes and fluoroalkanes, more particularly low-boiling alkanes and fluoroalkanes.

Physical blowing agents are usually selected from the group comprising alkanes and/or cycloalkanes having at least 4 carbon atoms, dialkyl ethers, esters, ketones, acetals, fluoroalkanes having 1 to 8 carbon atoms and tetraalkylsilanes having 1 to 3 carbon atoms in the alkyl chain, more particularly tetramethylsilane.

Examples are propane, n-butane, isobutane, cyclobutane, n-pentane, isopentane, cyclopentane, cyclohexane, dimethyl ether, methyl ethyl ether, methyl butyl ether, methyl formate, acetone, and also fluoroalkanes which can be degraded in the troposphere and therefore are harmless to the ozone layer, such as trifluoromethane, difluoromethane, 1,1,1,3,3-pentafluorobutane, 1,1,1,3,3-pentafluoropropane, 1,1,1,2,3-pentafluoropropene, 1-chloro-3,3,3-trifluoropropene, 1,1,1,2-tetrafluoroethane, difluoroethane and 1,1,1,2,3,3,3-heptafluoropropane, and also perfluoroalkanes, such as C3F8, C4F10, C5F12, C6F14, and C7F17. Particular preference is given to hydrocarbons, preferably pentanes, more particularly cyclopentane. The physical blowing agents mentioned can be used alone or in any desired combination with one another.

Chemical blowing agents include isocyanate and water (for polyurethanes), azo-, hydrazine and other nitrogen-based materials (for thermoplastic and elastomeric foams), and sodium bicarbonate (aka baking powder, used in thermoplastic foams). Here gaseous products and other by-products are formed by a chemical reaction(s), promoted by the process or a reacting polymer's exothermic heat. Since the blowing reaction occurs forming low molecular weight compounds acting as the blowing gas, additional exothermic heat is typically also released.

Carbon dioxide is used as a blowing agent adjunct in the practice of this invention. In one embodiment the carbon dioxide is gaseous when mixed with one or more of the other components of the process. In one embodiment the carbon dioxide is liquid when mixed with one or more of the other components of the process.

In one embodiment a physical blowing agent is used in combination with carbon dioxide in either a gaseous or liquid state. In one embodiment a chemical blowing agent is used in combination with carbon dioxide in either a gaseous or liquid state. In one embodiment a mixture of a physical and chemical blowing agents is used in combination with carbon dioxide in either a gaseous or liquid state. In one embodiment a physical blowing agent, particularly a hydrocarbon and more particularly a pentane, particularly cyclopentane, is used in combination with liquid carbon dioxide.

Other blowing agents of interest include the mixtures of heptafluorobutenes and tetrafluoropropenes as described in U.S. Pat. No. 7,563,384.

The blowing agents used in the practice of this invention are used in known amounts and in known ways. The weight ratio of carbon dioxide, particularly liquid carbon dioxide, to other blowing agent, particularly a hydrocarbon such as cyclopentane, can range widely, from 99:1 to 1:99, or from 90:10 to 10:90, or from 80:20 to 20:80, or from 70:30 to 30:70, or from 60:40 to 40:60, or 50:50.

Catalysts typically used in the practice of this invention include those known to be useful for facilitating polyurethane production. The catalysts include metal and non-metal catalysts. Examples of the metal portion of the metal catalysts useful in the present invention include tin, titanium, zirconium, lead, iron cobalt, antimony, manganese, bismuth and zinc compounds. In one embodiment the tin compounds useful for facilitating crosslinking in the sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like. The catalyst is used in known amounts and in known ways, e.g., carried by one or both components of the polyurethane or polyisocyanurate in an amount typically from 0.001 to 5, more typically from 0.01 to 2, weight percent (wt %) based on the weight of the foam.

The inert gases used in the practice of this invention include, but are not limited to, noble gases, nitrogen, and any other gas that does not react with the other components of the mixture under mixing conditions. The amount of gas and rate of gas addition will vary with the application. Maximum gas content is determined by the ability to maintain the liquid as the continuous phase. Minimum gas content is determined by the requirements of the final application. Liquids are added without gas, i.e., no gas in the liquids before entrance into the first pass. Typically if gas and liquid streams are simply joined (e.g., mixed at a T-junction of intersecting pipes), non-uniform froths are formed.

The isocyanate and/or polyol components of this invention can also include one or more surfactants, typically a non-ionic surfactant, such as polyethylene glycol, polypropylene glycol, ethoxylated castor oil, oleic acid ethoxylate, alkylphenol ethoxylates, copolymers of ethylene oxide and propylene oxide, copolymers of silicones and polyethers, copolymers of silicones and ethylene oxide and/or propylene oxide. The surfactant, if used, is typically used in an amount such that the froth product comprises, 0.1 to 10, more typically 0.5 to 8 and even more typically 1 to 6 wt % of the surfactant.

The following examples are illustrative of the invention.

EXAMPLES

Example 1

Formulation 1

Formulation 1 is a baseline formulation that contains no added carbon dioxide gas. Formulation 2 is formulation 1 with carbon dioxide gas added to the polyol and isocyanate blends. Using a new evaluation test, Formulation 2 demonstrates the improvement in leak-resistance that occurs in a simulated leaky mold by adding the carbon dioxide and the improvement in foam formulation that results without having to use static mixer ('after-mixer).

A polyol blend is made in a 15-gallon keg using the formulation as shown in Table 1 by starting with a 'pre-blend' without pentane and then adding the pentane and rolling on a drum roller to blend. After blending, the blend is transferred to a 17-gallon metal cylinder. Papi 27 isocyanate is added to a different 17-gallon cylinder. The blend is considered a 'pour' system, meaning that the physical blowing agent is a liquid and has no, or almost no, frothing at the exit of the applicator gun. The blending of the polyol blend and isocyanate sides is, generally, poor unless a static mixer ('after-mixer') is used at the applicator gun end. A 12-inch tube may be used with the static mixing to further improve mixing of the components.

TABLE 1

| Formulation 1 | |
|---|---|
| Voracor ® CR 1023 | % |
| Voranol 360 | 33.47 |
| Voranol 490 | 22.51 |
| Voranol RA 640 | 3.49 |
| Voranol 800 | 3.49 |
| Voratec SD 301 | 16.76 |
| Terate 2031 | 3.49 |
| Polycat 5 | 0.41 |
| Polycat 8 | 0.41 |
| Tegostab B-8462 | 2.25 |
| Water | 1.91 |
| Cyclopentane IP 85 | 11.81 |
| Total | 100 |

VORACOR CR 1023 is a system of components for the manufacture of polyurethane foam and is available from The Dow Chemical Company.

VORANOL 360, 490, RA 640, and 800 are polyether polyols are available from The Dow Chemical Company.

VORATEC SD 301 is a low-viscosity, glycerine-initiated polyether triol available from The Dow Chemical Company.

TERATE 2031 is an aromatic polyester polyol available from Invista.

POLYCAT 5 and 8 are liquid amines (pentamethyldiethylenetriamine) and N,N-Dimethylcyclohexylamine, respectively, blowing agents available from Air Products.

TEGOSTAB B-8462 is rigid foam stabilizer available from Evonik.

The two cylinders are attached to a hydrocarbon-safe ELIMINATOR equipment. The hydrocarbon-safe ELIMINATOR is commercially available equipment. The isocyanate/polyol blend ratio is adjusted to 100/80+/−2. Nominal flow rate is 12 lb/minute. In one type of test, no after-mixing is used. In another type of test, an after-mixer with 12-inch long tube attached is used.

Formulation 2

The Formulation 1 polyol blend is used. The pressure in the cylinder is about 40 psi. The headspace is nitrogen. A high-pressure hose from a carbon dioxide gas cylinder is attached to the polyol blend and carbon dioxide is added until 200 psi is reached. The hose is disconnected and the cylinder is rolled to blend in the carbon dioxide. The pressure in the cylinder has dropped in 20-30 minutes and carbon dioxide is added again until 200 psi is reached. Several additions of carbon dioxide are made until there is less than 5% drop in pressure below 200 psi after rolling. The procedure is repeated for the isocyanate side. Table 2 shows the amount added to each cylinder by weight increase.

TABLE 2

| Formulation 2 | | | |
|---|---|---|---|
| Blend | Weight of Material in Cylinder Before CO2 | Amt CO2 Added | % CO2 |
| Polyol | 67.3 lbs | 1.6 lbs | 2.32 |
| Isocyanate | 39.3 lbs | 3.1 lbs | 7.31 |

A ten-second dispensing of the polyol blend and isocyanate blends is captured in large paper cups. The polyol blend had very fine bubbles and was stable for at least ten minutes. The foam portion had about 9.5 times the volume as the remaining liquid. The isocyanate blend had larger bubbles and appeared to have acceptable stability, but was not to be as stable as the polyol blend. The frothy foam had about 5 times the volume of the liquid isocyanate. The lower volume of foam from the isocyanate even though a larger percentage was added to the cylinder may be due to loss of carbon dioxide at the applicator gun exit, among other factors.

Results
Frothiness and Foam Appearance
No After-Mixer

Formulation 1 was liquid at the exit of the applicator gun. Foam specimens from free-rise samples were very coarse and poorly mixed. Core density was 1.6 lb/ft$^3$ Formulation 2 was very frothy at the exit of the applicator gun. The foam from the free-rise bag sample showed a significant improvement in foam formulation and, typically, had foam had fine cells. This demonstrates that the carbon dioxide is able to significantly enhance the mixing in an Eliminator without an after-mixer. The core density of the free-rise bag sample was 1.30 lb/ft$^3$. Some shrinkage did occur with the foam and there were a few larger voids.

With After-Mixer and 12-Inch Tube

Formulation 1 was a liquid when it exited the tube. The foam was of good quality and had fine cells. The core density of free-rise samples was 1.48 lb/ft$^3$. Formulation 2 exited the tube with a frothy characteristic, similar to, but not as extensive as without an after-mixer and tube. The foam was of good quality and had fine cells. The core density was 1.42 lb/ft$^3$.

Leak-Resistance Testing

The leak-resistance of a formulation depends upon the specific end-user's mold design and tolerances and any fasteners. As each mold is different, one cannot simulate all molds in the laboratory. However, a simulated leak test was developed to allow comparison of the frothiness of formulations that may be related to the ability of a formulation to be leak-resistant in leaky molds. This simulated test consisted of attaching a common window screen to the side of a 18"×18"×16" cardboard box which has had one of its sides removed. Liquid 'pour' formulations will tend to flow through the holes in the window screen where a frothy foam will tend not.

A cardboard box as described above is set with the screen side towards the side and the box setting on top of another box. A five-second shot (~450 grams) is dispensed onto the bottom of the box with the screen, right next to the screen. Immediately after dispensing, the box is turned over onto another box so that the material will flow onto the screen. After setting, the percentage of foam that has been retained above the screen, below the screen but attached to the screen and that has fallen into the box below is calculated.

Table 3 reports the results. There is a significant increase in the amount of material that is retained on the screen for the formulation which has the carbon dioxide in it, demonstrating that the added carbon dioxide improves the leak-resistance of a pour system (such as Formulation 1) in a mold. The third formulation shown in the table is a traditional-type of formulation which uses the low GWP gaseous blowing agent HFO-1234ze in place of the HFC-134a in the polyol and the isocyanate sides. An after-mixer and 12-inch tube is used with this formulation. As this is a 'froth'-type formulation, nearly 100% of the formulation was retained on the screen. The fourth formulation is a different formulation containing the liquid low GWP blowing agent 24% FEA-1100 in the polyol side and none in the isocyanate side. Like Formulation 1, this is a 'pour' system which is processed with an after-mixer/12-inch tube. The results show that a significant percentage leaks through the screen. An added benefit to using the carbon dioxide is the slight reduction in core density.

TABLE 3

Screen Leak Test Results

| Formulation Description | Type | % Above Screen | % Below Screen (attached) | % in bottom box |
|---|---|---|---|---|
| Voracor CR 1023 | Pour | 62 | 15 | 23 |
| Voracor CR 1023 w/CO2 | CO2 Froth | 96 | 4 | 0 |
| Delta-Therm AG3001 w/HFO-1234ze & HFO-1233zd | Froth | 100 | 0 | 0 |
| Delta-Therm AG3001 w/FEA-1100 | Pour | 22 | 5 | 73 |

Example 2

Equipment

An ELIMINATOR low pressure impingement mixer capable of safely handling flammable blends is used.

Procedures

Verification of ventilation operation from the ventilation hood and floor sweep is made using a flow meter. The percent hydrocarbon is measured to make sure it is 0 ppm. The cylinders are purged with nitrogen prior to filing with the flammable formulation. Nitrogen, not air, is used as the source of pressure on cylinders during operation. If molds are used, molds are de-energized and purged with nitrogen prior to dispensing of the foam. The cylinders are grounded during operation using a ground-verification system. The hydrocarbon-safe ELIMINATOR is grounded during operation using a ground-verification device. Froth is dispensed into non-static containers (not plastic bags). Non-static tools are used for tasks where flammable material may be exposed to the environment (attaching/detaching Stratoflex hoses, adjustment of A/B ratio on dispenser, etc.).

This example illustrates the processing and foam properties from a flammable froth formulation made using the hydrocarbon-safe ELIMINATOR. The blowing agent is HFO-1234ze and HFC-245fa. HFO-1234ze is a gaseous low GWP blowing agent having a boiling point of −19 C and available from Honeywell.

Preparation of the Polyol Blend

The formulation used in this Example 2 is shown in Table 4. The blend, minus the HFO-1234ze is added to a 17-gallon cylinder. The HFO-1234ze is added and the blend is rolled on a drum roller until mixed.

TABLE 4

Formulation of Example 2

| Material | Percent | lbs |
|---|---|---|
| Voranol 360 | 34.79 | 48.71 |
| Voranol 270 | 17.71 | 24.80 |
| Voranol 391 | 17.29 | 24.20 |
| Fyrol PCF | 5.62 | 7.87 |
| Polycat 8 | 0.29 | 0.40 |
| Triethylamine | 0.60 | 0.84 |

TABLE 4-continued

Formulation of Example 2

| Material | Percent | lbs |
|---|---|---|
| Alpha-Methyl Styrene | 0.04 | 0.05 |
| TEP | 2.42 | 3.39 |
| Tegostab B 8465 | 1.78 | 2.49 |
| Water | 1.89 | 2.65 |
| 245fa | 7.54 | 10.56 |
| HFO-1234ze | 10.03 | 14.04 |

Preparation of the Isocyanate Blend

PAPI 27 is added to a 17-gallon cylinder. PAPI are polymeric methylene diphenyl diisocyanates (MDI), e.g., polymethylene polyphenylisocyanates, that contain MDI and are available from The Dow Chemical Company.

Operation

This test is conducted one day after the HFO-1234ze is added to the formulation. The room is prepared for using the hydrocarbon-safe ELIMINATOR with flammable blends. The hydrocarbon-safe ELIMINATOR is grounded using ground-verification equipment. The polyol blend and isocyanate cylinders are verified to be grounded using ground-verification equipment. The polyol blend and isocyanate cylinders are attached to the hydrocarbon-safe ELIMINATOR hose train using non-sparking tools. Nitrogen is supplied to the polyol blend and isocyanate cylinders at 235 psi. The hydrocarbon-safe ELIMINATOR control unit is purged with air. The hydrocarbon-safe ELIMINATOR is plugged into a Class 1 outlet and the power switch turned on. A three-stage plastic static mixer attachment (known as 'after-mixer') with 12-inch long tube is, optionally, attached to the dispenser gun. The material valves on the cylinders are opened. An airline is attached to the dispenser gun. The plug valves on the dispenser gun are opened. The shot duration time is set to 10 seconds. Adjustments are made to the flow controllers of the dispenser gun to achieve the aim isocyanate/polyol blend ratio. Ten-second foam samples are collected. Reactivity is determined. A Brett mold is heated to 85° F. (30° C.). Release agent is applied to the mold surface. Prior to making a sample, the mold is de-energized, the mold is grounded and then purged with nitrogen. Brett-mold samples are collected. Core densities are determined from 10-second samples made from the ELIMINATOR. Standard properties are determined for the Brett mold samples.

Example 2A

The final isocyanate/polyol blend ratio is 100/95. Example 2A is processed without static-mixer or 12-inch long tube.

Results

The foam exits the ELIMINATOR with a frothy appearance and does not exhibit striations or observable inadequate mixing during the dispensing process. Cubes cut from samples did show some striations. The Brett mold made had about a 6% over-pack density (based upon minimum fill density from high-pressure testing with the same material). The Brett mold sample did show shrinking on about 25% of the surface, indicative of incomplete mixing. The properties are shown in Table 5.

Example 2B

Example 2B is processed with a three-flight plastic static mixer with a 12-inch long plastic tube attached to the end of the static mixer. Air is used to improve the mixing through the static mixer. The air flow rate is 1-2 ft$^3$/minute.

Results

The foam exits the ELIMINATOR with a frothy appearance and does not exhibit visual striations during the foaming. Cubes cut from the center of the 10-second samples have a good visual appearance and no indication of incomplete mixing. The Brett mold sample is about a 2% overpack. Samples cut from the Brett mold have a good foam appearance and there is no observable shrinkage of the foam that would indicate inadequate mixing. These properties are also shown in Table 5.

TABLE 5

Properties of Examples 2A and 2B Foams

| | Example 1A | Example 1B |
|---|---|---|
| NB201100909-961 | | |
| Flow rate (lbs/minute) | 13.4 | 13.1 |
| Gel time (seconds) - material temp. | 119 | 120 |
| Free Rise Density (lbs/ft3) | 1.41 | 1.41 |
| BRETT MOLD SAMPLES | | |
| Approximate Minimum Fill Density (lbs/ft3) | 1.97 | 1.97 |
| Flow Index (Min. Fill Density/Free-Rise Core Density) | 1.40 | 1.40 |
| Estimated Over-Pack (%) | 6% | 2% |
| Applied Density (lbs/ft3) | 2.09 | 2.01 |
| Average Density Distribution (lbs/ft3) | 0.032 | 0.05 |
| Core Density (lbs/ft3) | 2.07 | 1.81 |
| Closed Cell Content (%) | 97.5 | 97.1 |
| K-Factor (Btu*in/sq. ft.*h*DegF.) | | |
| (−5/45/20 F. mean) | 0.135 | 0.131 |
| (30/80/55 F. mean) | 0.146 | 0.142 |
| (50/100/75 mean) | 0.16 | 0.155 |
| Compressive Strength (lbs/ft2) | 20.4 | 12.3 |
| Dimensional Stability (% Change) | | |
| 14 days Freezer at −20 F. | −0.3 | 0.1 |
| 14 days at 158 F./0% RH | 0.2 | 0.5 |
| 14 days at 158 F./97% RH | 18.4 | 22.6 |

Example 3

This example illustrates the processing and foam properties from a flammable non-froth formulation made using the hydrocarbon-safe ELIMINATOR. The blowing agent is Cyclopentane IP 85 made by Haltermann Chemicals. It is a blend of, nominally, 85% cyclopentane with the balance of the material being isopentane and other hydrocarbons. The formulation tested in Example 3 is shown in Table 6.

TABLE 6

Pentane Formulation VORACOR CR 1023

| Voracor ® CR 1023 | % | lbs |
|---|---|---|
| Voranol 360 | 33.47 | 33.47 |
| Voranol 490 | 22.51 | 22.51 |
| Voranol RA 640 | 3.49 | 3.49 |
| Voranol 800 | 3.49 | 3.49 |
| Voratec SD 301 | 16.76 | 16.76 |
| Terate 2031 | 3.49 | 3.49 |
| Polycat 5 | 0.41 | 0.41 |
| Polycat 8 | 0.41 | 0.41 |
| Tegostab B-8462 | 2.25 | 2.25 |
| Water | 1.91 | 1.91 |
| Cyclopentane IP 85 | 11.81 | 11.81 |
| Total | 100 | 100 |

Preparation of the Polyol Blend

The blended ingredients, minus the Cyclopentane IP 85, are added to a 15-gallon keg. The IP 85 is added to the keg and the keg rolled on a drum roller until mixed. A 17-gallon cylinder designated for flammable polyol blends is purged with nitrogen. The blend is added to the cylinder.

Preparation of Isocyanate Blend

PAPI 27 is added to a 17-gallon cylinder.

Operation

The room is prepared for using the hydrocarbon-safe ELIMINATOR with flammable blends. The hydrocarbon-safe ELIMINATOR is grounded using ground-verification equipment. The polyol blend and isocyanate cylinders are verified to be grounded using ground-verification equipment. The polyol blend and isocyanate cylinders are attached to the hydrocarbon-safe ELIMINATOR hose train using non-sparking tools. Nitrogen is supplied to the polyol blend and isocyanate cylinders at 235 psi. The hydrocarbon-safe ELIMINATOR control unit is purged with air. The hydrocarbon-safe ELIMINATOR is plugged into a Class 1 outlet and the power switch turned on. A three-stage plastic static mixer attachment (known as 'after-mixer') with 12-inch long tube is attached to the dispenser gun. The material valves on the cylinders are opened. An air line is attached to the dispenser gun. Air flow rate through the dispenser gun is set to 1-2 ft$^3$/minute. The plug valves on the dispenser gun are opened. The shot duration time is set to 10 seconds. Adjustments are made to the flow controllers of the dispenser gun to achieve the aim isocyanate/polyol blend ratio of 100/81. Ten-second foam samples are collected. Reactivity is determined. A Brett mold is heated to 113° F. (45° C.). Release agent is applied to the mold surface. Prior to making a sample, the mold is de-energized, the mold is grounded and then purged with nitrogen. Brett-mold samples are collected. Core densities are determined from 10-second samples made from the ELIMINATOR. Standard properties are determined for the Brett mold samples.

Results

The foam processed well though the hydrocarbon-safe ELIMINATOR. Cubes cut from the center of the free-rise samples appeared to be well-mixed with no striations. Samples made on the Brett mold had good appearance. Table 7 shows the properties for free-rise and Brett samples. Brett samples are made at 5% over-pack density (Example 3A), 10% over-pack density (Example 3B) and 15% over-pack density (Example 3C).

TABLE 7

Foam Properties

|  | Example 2A, 2B and 2C |
| --- | --- |
| Flow rate (lbs/minute) | 12.3 |
| Gel time (seconds) - 64F. material temp. | 90 |
| Free Rise Density (lbs/ft3) | 1.48 |
| BRETT MOLD SAMPLES | |
| Minimum Fill Density (lbs/ft3) | 1.95 |
| Flow Index (Min. Fill Density/ Free-Rise Core Density) | 1.32 |

| | Sample 2A | Sample 2B | Sample 2C |
| --- | --- | --- | --- |
| Over-pack (%) | 5% | 10% | 15% |
| Applied Density (lbs/ft3) | 2.08 | 2.18 | 2.27 |
| Average Density Distribution (lbs/ft3) | 0.0355 | 0.0334 | 0.0255 |
| Core Density (lbs/ft3) | 1.81 | 1.88 | 1.93 |
| Closed Cell Content (%) | 92.1 | 94 | 93.7 |
| K-Factor (50/100/75 F. mean)/ (Btu*in/sq. ft.*h*DegF.) | 0.156 | 0.156 | 0.157 |

TABLE 7-continued

Foam Properties

| Compressive Strength (lbs/ft2) | 13.4 | 17 | 18.8 |
| --- | --- | --- | --- |
| Dimensional Stability (% Change) | | | |
| 14 days Freezer at −20 F. | −0.4 | −0.7 | −0.9 |
| 28 days Freezer at −20 F. | −0.5 | 0.1 | −0.2 |
| 14 days at 158 F./0% RH | 0.5 | −0.5 | −0.5 |
| 28 days at 158 F./0% RH | 0.8 | 0.5 | 0.6 |
| 14 days at 158 F./97% RH | 8.6 | 7.1 | 8.2 |
| 28 days at 158 F./97% RH | 8.7 | 7.8 | 9.0 |

Example 4

Example 4 illustrates the processing and foam properties from a flammable non-froth formulation containing a carbon dioxide adduct to impart some frothiness to the foam soon after dispensing. The blowing agent is Cyclopentane IP 85 made by Haltermann Chemicals. It is a blend of, nominally, 85% cyclopentane with the balance of the material being isopentane and other hydrocarbons. The carbon dioxide adduct is SPECFLEX NR 556. The formulation tested in this example is shown in Table 8.

TABLE 8

Pentane Formulation of Example 4

| NB201100909-231 | Percent | lbs |
| --- | --- | --- |
| Voranol 360 | 32.620 | 26.55 |
| Voranol 490 | 21.947 | 17.87 |
| DSD 301 | 16.349 | 13.31 |
| Voranol 800 | 3.406 | 2.77 |
| Voranol RA 640 | 3.406 | 2.77 |
| Terate 2031 | 3.406 | 2.77 |
| Polycat 5 | 0.404 | 0.33 |
| Polycat 8 | 0.404 | 0.33 |
| Tegostab B-8462 | 2.193 | 1.79 |
| Water | 1.866 | 1.52 |
| IP85 | | |
| Specflex NR 556 | 4 | 3.26 |
| IP 85 | 10 | 8.14 |
| Total | 100.00 | 81.40 |

A liquid pour system, such as one in which the physical blowing agent is a liquid, like Cyclopentane IP 85, has limitation in use for those end-users that have molds that are not tooled tightly enough to maintain a tight seal with a liquid 'pour' system. An advantage of a formulation containing a physical blowing agent that is a gas is that the foam exits the dispensing gun in a frothy state which imparts to the forming foam the viscosity characteristics that allows it to stay in 'leaky' molds with no, or minimal, leaking. Carbon dioxide adducts have been demonstrated to impart a frothy characteristic to polyurethane formulations, not immediately at the dispensing nozzle, but soon after the foam is dispensed. This example demonstrates the processing of a formulation containing a carbon dioxide adduct (SPECFLEX NR 556) through the hydrocarbon-safe ELIMINATOR.

Preparation of Polyol Blend

The blended ingredients, minus the Cyclopentane IP 85, are added to a 15-gallon keg. The IP 85 is added to the keg and the keg rolled on a drum roller until mixed. A 17-gallon cylinder designated for flammable polyol blends is purged with nitrogen. The blend is added to the cylinder.

Preparation of Isocyanate Blend

PAPI 27 is added to a 17-gallon cylinder.

Operation

The room is prepared for using the hydrocarbon-safe ELIMINATOR with flammable blends. The hydrocarbon-safe ELIMINATOR is grounded using ground-verification equipment. The polyol blend and isocyanate cylinders are verified to be grounded using ground-verification equipment. The polyol blend and isocyanate cylinders are attached to the hydrocarbon-safe ELIMINATOR hose train using non-sparking tools. Nitrogen is supplied to the polyol blend and isocyanate cylinders at 235 psi. The hydrocarbon-safe ELIMINATOR control unit is purged with air. The hydrocarbon-safe ELIMINATOR is plugged into a Class 1 outlet and the power switch turned on. A three-stage plastic static mixer attachment (known as 'after-mixer') with 12-inch long tube is attached to the dispenser gun. The material valves on the cylinders are opened. An air line is attached to the dispenser gun. Air flow rate through the dispenser gun is set to 1-2 ft$^3$/minute. The plug valves on the dispenser gun are opened. The shot duration time is set to 10 seconds. Adjustments are made to the flow controllers of the dispenser gun to achieve the aim isocyanate/polyol blend ratio of 100/76. Ten-second foam samples are collected. Reactivity is determined. A Brett mold is heated to 113° F. (45° C.). Release agent is applied to the mold surface. Prior to making a sample, the mold is de-energized, the mold is grounded and then purged with nitrogen. Brett-mold samples are collected. Core densities are determined from 10-second samples made from the ELIMINATOR. Standard properties are determined for the Brett mold samples.

Results

The foam processed though the hydrocarbon-safe ELIMINATOR without apparent visible striations. Three Brett molds are made at 5% over-pack. The Brett mold samples had good outward appearance. A test is developed to simulate a dispensing into a leaky mold. A 18x"×18"×18" cardboard box is prepared with the top side open and one of the sides cut out and covered with a window screen (very open). A five-second sample is dispensed onto the bottom of the cardboard box and the box immediately tipped over so the material would flow onto the side with the window screen. Several minutes later, after gelling, the box was tipped upright. The following is determined: (1) The amount of foam on top of the screen, (2) The amount of foam that flowed through the screen but kept attached to the screen and, (3) and the amount of foam that dropped onto the box below. Eighty-eight percent of the foam was contained above the screen, 12% went through the screen but remained attached to the screen and 0% fell below the screen to a box below. This demonstrates that the material frothed enough within a short time after dispensing to keep the bulk of the material from flowing through the window screen.

It is specifically intended that the present invention not be limited to the embodiments and illustrations contained herein, but include modified forms of those embodiments including portions of the embodiments and combinations of elements of different embodiments as come within the scope of the following claims.

We claim:

1. A process of making a polyurethane or polyisocyanurate foam, the process comprising the step of mixing under a low pressure of from 0.7 to 2.1 MPa:
   (A) an isocyanate;
   (B) a compound reactive with the isocyanate;
   (C) a liquid blowing agent; and
   (D) gaseous carbon dioxide,
   wherein components (A), (B), (C) and (D) are mixed within a low pressure impingement mixer, and components (A), (B), (C) and (D) are mixed without a static mixer.

2. The process of claim 1 in which the compound reactive with the isocyanate is a polyol.

3. The process of claim 1 in which the liquid blowing agent is a hydrocarbon blowing agent.

4. The process of claim 1 in which the gaseous carbon dioxide is first mixed with each of components (A) and (B) before components (A) and (B) are mixed with one another.

5. The process of claim 1 in which all of components (A), (B), (C) and (D) are mixed with one another simultaneously.

6. The process of claim 1 in which the weight ratio of gaseous carbon dioxide to the liquid blowing agent is from 60:40 to 40:60.

7. The process of claim 6 in which the liquid blowing agent is a hydrocarbon blowing agent.

* * * * *